United States Patent
Wöhlte

(10) Patent No.: US 9,971,947 B2
(45) Date of Patent: May 15, 2018

(54) VEHICLE VISION SYSTEM WITH CAMERA POWER CONTROL

(71) Applicant: MAGNA ELECTRONICS INC., Auburn Hills, MI (US)

(72) Inventor: Wilhelm Johann Wolfgang Wöhlte, Sailauf (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 234 days.

(21) Appl. No.: 14/812,195

(22) Filed: Jul. 29, 2015

(65) Prior Publication Data

US 2016/0033851 A1    Feb. 4, 2016

Related U.S. Application Data

(60) Provisional application No. 62/031,175, filed on Jul. 31, 2014.

(51) Int. Cl.

| H04N 5/225 | (2006.01) |
|---|---|
| H04N 5/228 | (2006.01) |
| G06K 9/00 | (2006.01) |
| H04N 7/18 | (2006.01) |
| H04N 5/232 | (2006.01) |
| G03B 17/00 | (2006.01) |

(52) U.S. Cl.
CPC ......... *G06K 9/00832* (2013.01); *G03B 17/00* (2013.01); *H04N 5/23241* (2013.01); *H04N 7/183* (2013.01); *G03B 2217/007* (2013.01)

(58) Field of Classification Search
CPC ............. H04N 5/23241; H04N 5/3698; H04N 1/00885; G03B 2217/007; G03B 7/26; G06F 1/3203; G06F 1/325; G09B 9/305; H01M 10/623; H02M 3/00; H02M 7/00
USPC ............................................ 348/372, 208.16
See application file for complete search history.

(56) References Cited

U.S. PATENT DOCUMENTS

| 5,550,677 A | 8/1996 | Schofield et al. |
|---|---|---|
| 5,670,935 A | 9/1997 | Schofield et al. |
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |
| 5,929,786 A | 7/1999 | Schofield et al. |
| 5,949,331 A | 9/1999 | Schofield et al. |
| 6,201,642 B1 | 3/2001 | Bos |
| 6,222,447 B1 | 4/2001 | Schofield et al. |

(Continued)

*Primary Examiner* — Chia-Wei A Chen
(74) *Attorney, Agent, or Firm* — Honigman Miller Schwartz and Cohn, LLP

(57) ABSTRACT

A vision system for a vehicle includes a camera, a power supply, a power filter and a microcontroller. The camera is configured to be disposed at a vehicle so as to have a field of view interior or exterior of the vehicle. The power supply is operable to supply a voltage for powering the camera. The power filter is in communication with the power supply and the camera and is operable to supply a voltage to the camera. The microcontroller is operable to measure a voltage level supplied to the power filter. Responsive to the determination that the measured voltage level is one of (i) a threshold amount above a nominal operating voltage of the camera and (ii) a threshold amount below the nominal operating voltage of the camera, the microcontroller adjusts the power supply to the camera.

17 Claims, 4 Drawing Sheets

(56) References Cited

U.S. PATENT DOCUMENTS

| | | |
|---|---|---|
| 6,302,545 B1 | 10/2001 | Schofield et al. |
| 6,396,397 B1 | 5/2002 | Bos et al. |
| 6,498,620 B2 | 12/2002 | Schofield et al. |
| 6,523,964 B2 | 2/2003 | Schofield et al. |
| 6,611,202 B2 | 8/2003 | Schofield et al. |
| 6,636,258 B2 | 10/2003 | Strumolo |
| 6,690,268 B2 | 2/2004 | Schofield et al. |
| 6,717,610 B1 | 4/2004 | Bos et al. |
| 6,757,109 B2 | 6/2004 | Bos |
| 6,802,617 B2 | 10/2004 | Schofield et al. |
| 6,806,452 B2 | 10/2004 | Bos et al. |
| 6,822,563 B2 | 11/2004 | Bos et al. |
| 6,850,270 B1* | 2/2005 | Suzuki ............... H04N 1/00899 348/207.2 |
| 6,882,287 B2 | 4/2005 | Schofield |
| 6,891,563 B2 | 5/2005 | Schofield et al. |
| 6,946,978 B2 | 9/2005 | Schofield |
| 7,005,974 B2 | 2/2006 | McMahon et al. |
| 7,038,577 B2 | 5/2006 | Pawlicki et al. |
| 7,145,519 B2 | 12/2006 | Takahashi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,859,565 B2 | 12/2010 | Schofield et al. |
| 7,881,496 B2 | 2/2011 | Camilleri et al. |
| 2004/0158756 A1* | 8/2004 | Totsuka ............... G06F 1/3203 713/323 |
| 2005/0063119 A1* | 3/2005 | Dowe ................ G03B 7/26 361/92 |
| 2005/0276081 A1* | 12/2005 | Bernat ............... H02H 7/1213 363/65 |
| 2008/0266740 A1* | 10/2008 | Smith ................ H02J 1/10 361/91.5 |
| 2009/0174978 A1* | 7/2009 | Nakamura ........... H02H 7/1213 361/90 |
| 2010/0157498 A1* | 6/2010 | Skov ................ G06F 1/266 361/93.9 |
| 2011/0134577 A1* | 6/2011 | Skarp ................ H01H 57/00 361/91.2 |
| 2011/0169496 A1* | 7/2011 | Fried ................ B60Q 11/005 324/503 |
| 2011/0310519 A1* | 12/2011 | Baba ................ H04N 5/63 361/91.1 |
| 2012/0032942 A1* | 2/2012 | Toyotaka ............. G09G 3/20 345/212 |
| 2013/0076903 A1* | 3/2013 | Quinn ............... G06K 9/00973 348/148 |
| 2013/0106187 A1* | 5/2013 | Gemin ............... B60L 7/14 307/43 |
| 2013/0258077 A1 | 10/2013 | Bally et al. |
| 2014/0163749 A1* | 6/2014 | Phillips ............... G05D 7/0676 700/283 |
| 2014/0218535 A1 | 8/2014 | Ihlenburg et al. |
| 2015/0015556 A1* | 1/2015 | Pappas ............... H01L 27/1225 345/211 |
| 2015/0204561 A1* | 7/2015 | Sadwick ............. F24F 11/006 236/1 C |
| 2015/0332739 A1* | 11/2015 | Conte ................ G11C 7/062 365/189.07 |
| 2016/0026192 A1* | 1/2016 | Phillips ............... H04N 7/185 348/143 |
| 2016/0198089 A1* | 7/2016 | Motohashi ........... H04N 5/23238 348/36 |
| 2017/0063243 A1* | 3/2017 | Gong ................ H02M 1/08 |
| 2017/0126041 A1* | 5/2017 | Sato ................. H02J 7/0052 |
| 2017/0174131 A1 | 6/2017 | Sigle |

* cited by examiner

VEHICLE VISION SYSTEM WITH CAMERA POWER CONTROL

CROSS REFERENCE TO RELATED APPLICATION

The present application claims the filing benefits of U.S. provisional application Ser. No. 62/031,175, filed Jul. 31, 2014, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides a microcontroller that measures a power supply voltage supplied to a camera and determines when the measured supplied voltage is greater than a normal camera operating voltage (such as by a threshold amount above a typical operating voltage) and less than the normal camera operating voltage (such as by a threshold amount below the typical operating voltage). Responsive to the determination of the higher or lower voltage levels, the system determines that a fault or malfunction has occurred and shuts down the power supply to the camera.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
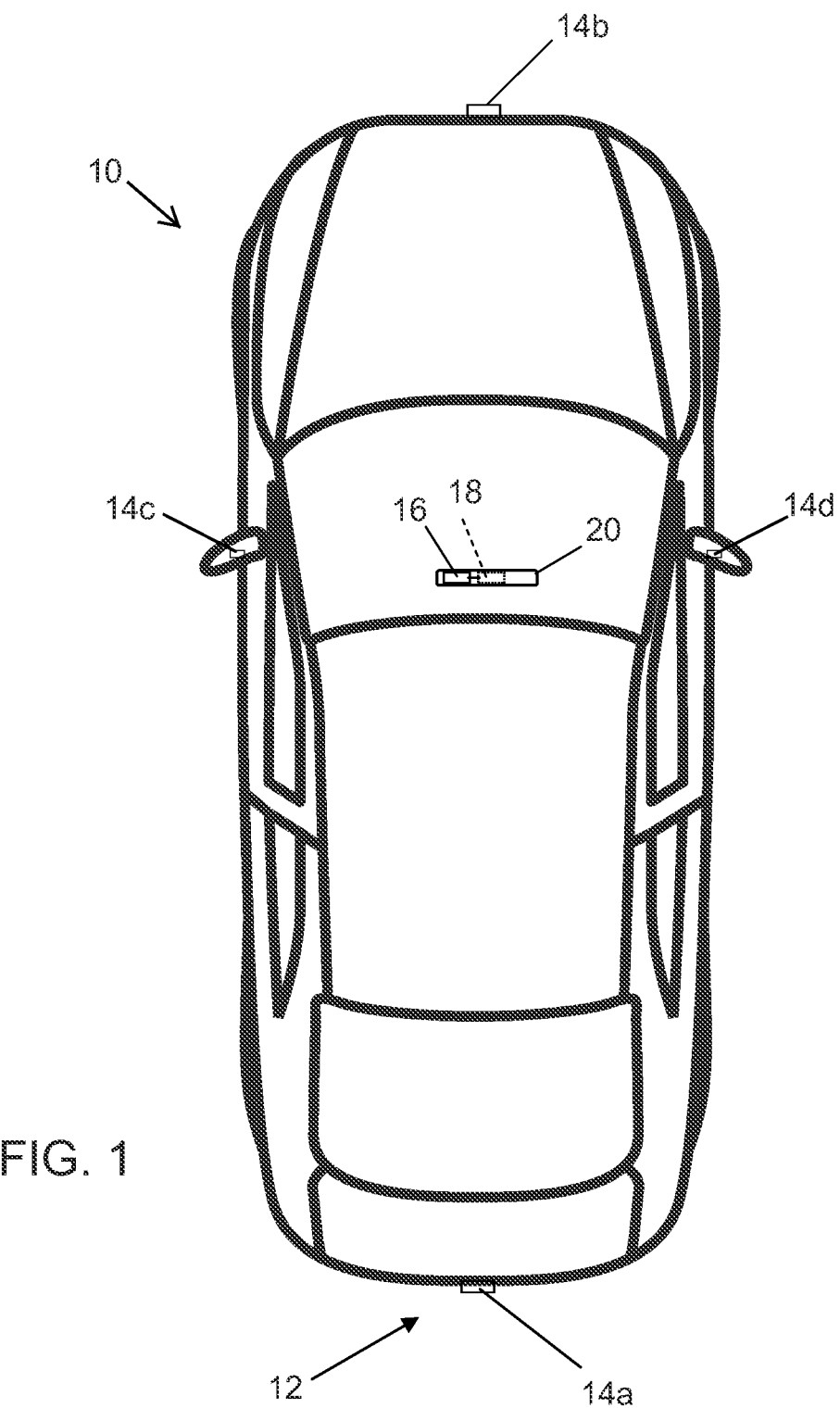
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

As described in U.S. patent application Ser. No. 13/800,697, filed Mar. 13, 2013, now published as U.S. Publication No. US-2013-0258077 (which is hereby incorporated herein by reference in its entirety), a camera circuit for detecting line defects on a non-phantom supply with purely (real) low-voltage differential signaling (LVDS) lines. The present invention provides for digital and analog cameras attached to the ECU by asymmetrical LVDS or MOST via a deserializer and having a phantom supply.

Figure 2:
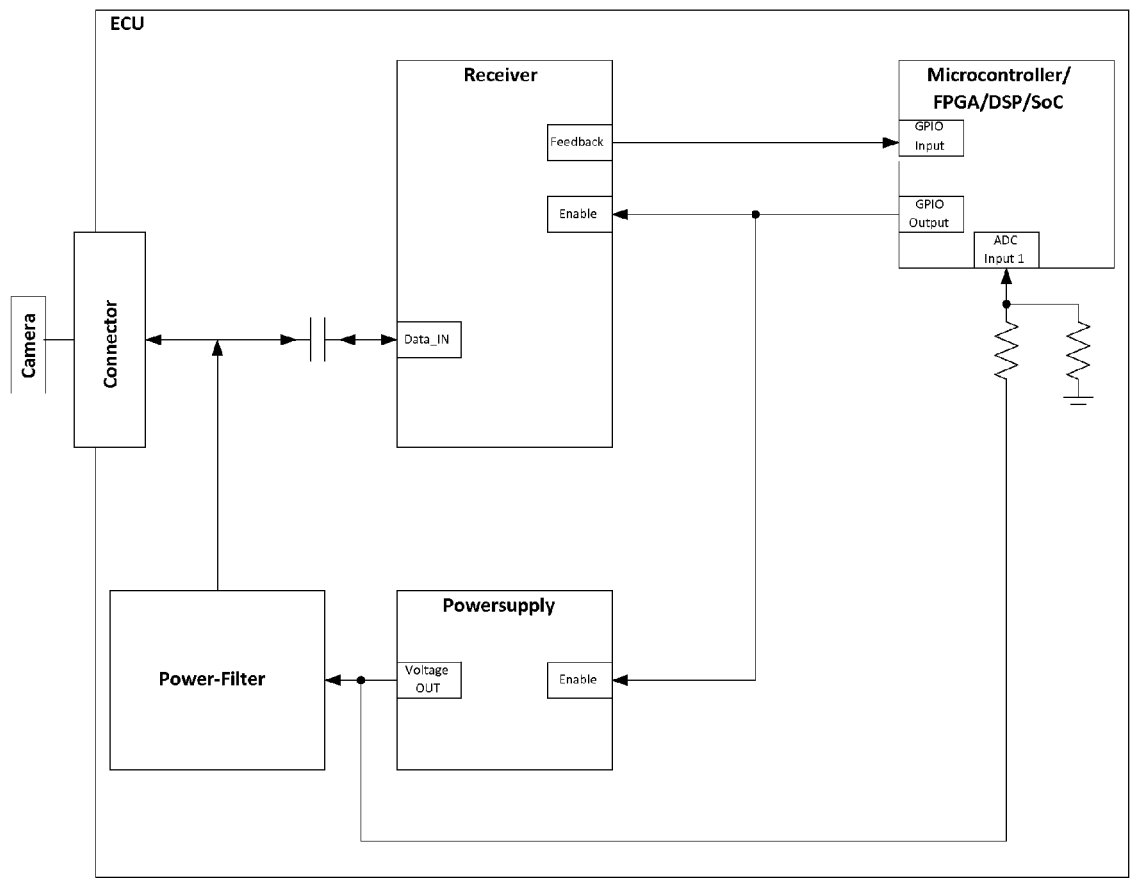
FIG. 2 is a schematic showing an ECU LVDS camera interface in accordance with the present invention.

The ECU LVDS camera interface is shown in FIG. 2. At the node labeled 'CONNECTOR', a camera connects to the ECU via a LVDS line (with the camera at the other end of the line) and an asymmetrical LVDS driver has a Signal/DC power divider filter stage. The ECU also has a DC/AC decoupling filter, symbolized in FIG. 2 as the capacitor in the line of the video or data in of the 'RECEIVER'. When the system is switched on, the 'Microcontroller/FPGA/DSP/SoC' sets the register GPIO (general purpose input/output) output to 'Enable' the Receiver and the Power supply. The Power supply then starts to supply DC voltage to the Power-Filter, which is substantially a Low pass filter. The DC voltage passes through the filter and supplies or powers the camera. When everything operates normally, the camera provides a video image via LVDS data and consumes a plausible or nominal amount of DC power. The DC consumption can be estimated by the read back DC signal measured by an ADC input node (ADC input 1) at the microcontroller.

Different read back DC voltage levels may indicate either a malfunction/error states/modes or normal operation modes, which may be reportable to vehicle diagnostic systems. Specific measures may be taken with the according operation or malfunction/error states/modes. Thus, responsive to detection of changes or high or low voltage levels (higher or lower than the normal operating voltage of the camera), the system may determine when a fault or malfunction has occurred and may shut down the power supply to the camera accordingly.

The mode state machine may have one or more additional parameters as inputs, such as the ECU supply power voltage level. For example, the modes may include:

| Voltage: | Indication: | Possible action: |
| --- | --- | --- |
| 0 V | Shortcut to ground or ECU supply stage defect | shut off DC power |
| 0 . . . 9 V | Camera malfunction (too high power consumption) | shut off DC power |
| 9 V . . . 15 V | Normal operation | no action |
| 15 V . . . infinite | Overvoltage, short cut to high voltage | shut down ECU (overvoltage protection mode) |

The voltages shown in the table are exemplary. The voltages assumed 'normal' may be different depending on the particular bus systems and/or required camera supply voltage levels of the system.

Figure 3:
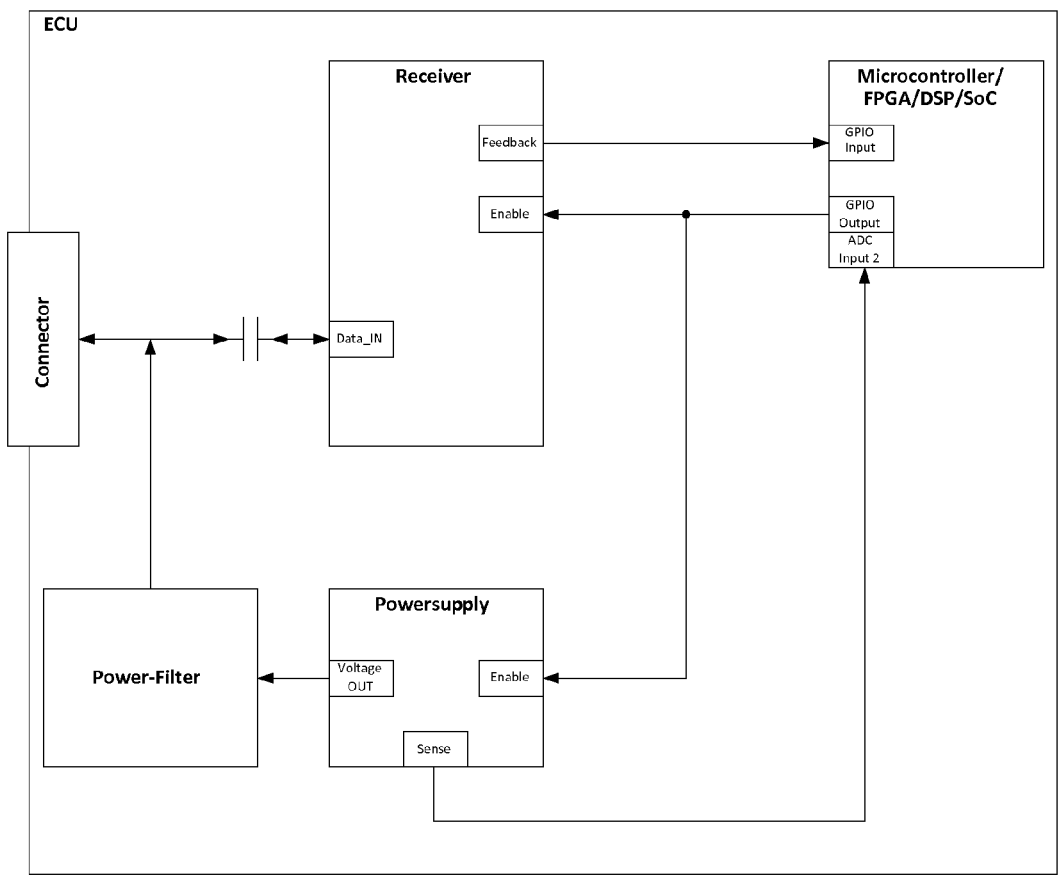
FIG. 3 is another schematic showing an ECU LVDS camera interface in accordance with the present invention.

The circuit of FIG. 3 supports the mode state machine as the system in accordance with invention specified above with the exemplary circuit of FIG. 2, but has an alternative sensing circuit. Instead of having a read back line on the power supply stages output pin, the power supply may have an extra 'sense' pin. The Microcontroller, FPGA, DSP or SoC may receive the voltage signal from that Sense pin at an ADC input (ADC Input 2).

Figure 4:
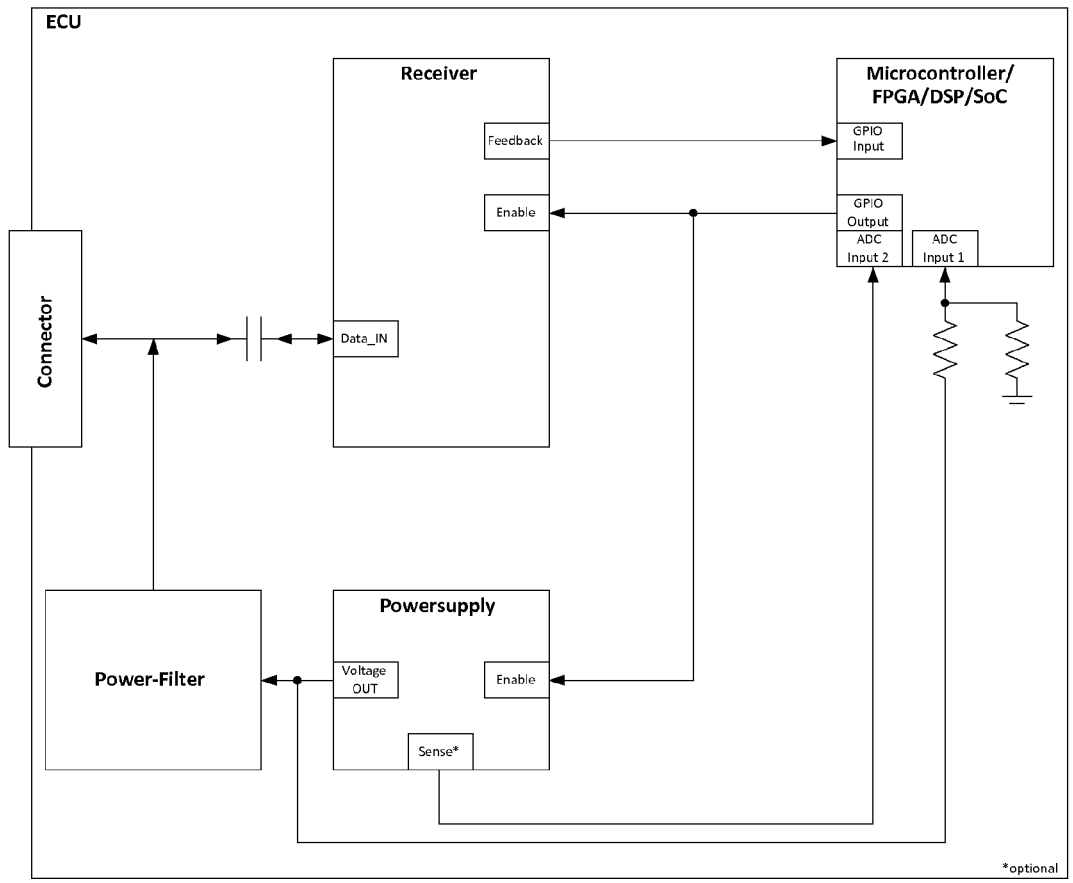
FIG. 4 is schematic combining the circuits of both schematics of FIGS. 2 and 3 showing an ECU LVDS camera interface in accordance with the present invention.

FIG. 4 shows another schematic in which the power supply has a 'Sense' diagnose output (pin). The Microcontroller, FPGA, DSP or SoC may read that diagnose pin at an additional analog input pin (ADC Input 2) which allows the voltage control of the present invention to confirm that the power supply is working normally or defective when reading indicative voltages via an additional signal line from the power supply's output to ADC Input 1. When the sense pin reports 'defective', the possible action upon an over voltage or under voltage may be the same as that shown in the table above but the error indication may be 'power supply stage defect' instead of 'defect camera or line'. The modes may be:

| Voltage: | Indication: | Possible action: |
| --- | --- | --- |
| 0 V | ECU supply stage defect | shut off DC power |
| 0 . . . 9 V | Power supply - Under-voltage | shut off DC power |
| 9 V . . . 15 V | Normal operation | no action |
| 15 V . . . infinite | Power supply - Overvoltage | shut down ECU (overvoltage protection mode) |

Therefore, the present invention measures a power supply voltage to a power filter that supplies voltage to the camera and determines when the measured supplied voltage is greater than a normal operating level (such as by a threshold amount above a typical operating voltage) and less than the normal operating level (such as by a threshold amount below the typical operating voltage). Responsive to the detection of the higher or lower voltage levels, the system may determine when a fault or malfunction has occurred and may shut down the power supply to the camera accordingly.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. Nos. 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
    a camera configured to be disposed at a vehicle so as to have a field of view interior or exterior of the vehicle;
    a power supply operable to supply a voltage for powering said camera;
    a power filter in communication with said power supply and said camera and operable to supply a voltage to said camera;
    a microcontroller operable to measure a voltage level supplied to said power filter;
    wherein, responsive to the determination that the measured voltage level is one of (i) a threshold amount above a nominal operating voltage of said camera and (ii) a threshold amount below the nominal operating voltage of said camera, said microcontroller adjusts the power supply to said camera;
    wherein said power filter, said power supply and said microcontroller are part of a control unit; and
    wherein the voltage is measured at both of (i) a node between said power supply and said power filter and (ii) a sense node at said power supply, and wherein said microcontroller, responsive to the measured voltages, determines if said power supply is working normally or is defective.

2. The vision system of claim 1, wherein, responsive to a determination that the measured voltage level is one of (i) a threshold amount above the nominal operating voltage of said camera and (ii) a threshold amount below the nominal operating voltage of said camera, said microcontroller determines that a fault or malfunction has occurred and, responsive to determination of a fault or malfunction, said microcontroller shuts off the power supply to said camera.

3. The vision system of claim 1, wherein, responsive to a determination that the measured voltage level is about zero volts, said microcontroller determines that a malfunction has occurred and shuts off the power supply to said camera.

4. The vision system of claim 1, wherein, responsive to a determination that the measured voltage level is greater than about zero volts and less than the threshold amount below the nominal operating voltage of said camera, said microcontroller determines that a camera malfunction has occurred and shuts off the power supply to said camera.

5. The vision system of claim 1, wherein, responsive to a determination that the measured voltage level is greater than the threshold amount above the nominal operating voltage of said camera, said microcontroller determines that an overvoltage condition shuts off the power supply to said camera.

6. The vision system of claim 1, wherein the nominal operating voltage of said camera is about 12 volts.

7. The vision system of claim 6, wherein the voltage level that is a threshold amount below the nominal operating voltage of said camera is about 9 volts.

8. The vision system of claim 6, wherein the voltage level that is a threshold amount above the nominal operating voltage of said camera is about 15 volts.

9. The vision system of claim 1, wherein said power filter comprises a low pass filter.

10. The vision system of claim 1, wherein said camera is connected to a connector of said control unit via a low-voltage differential signaling wire.

11. The vision system of claim 10, wherein said control unit comprises an asymmetrical low-voltage differential signaling wire driver.

12. The vision system of claim 1, wherein a receiver of said control unit receives data captured by said camera and provides an output to said microcontroller for processing.

13. The vision system of claim 1, wherein the measured voltage is measured at one of (i) a node between said power supply and said power filter and (ii) a sense node at said power supply.

14. A vision system for a vehicle, said vision system comprising:
    a camera configured to be disposed at a vehicle so as to have a field of view interior or exterior of the vehicle;
    a control unit comprising a power supply, a power filter, a receiver and a microcontroller, wherein said camera is connected to said control unit;
    wherein said power supply operable to supply a voltage for powering said camera;
    wherein said power filter is in communication with said power supply and said camera and operable to supply a voltage to said camera;
    wherein said receiver receives data captured by said camera and provides an output to said microcontroller for processing;
    wherein said microcontroller is operable to measure a voltage level supplied to said power filter;
    wherein, responsive to the determination that the measured voltage level is one of (i) a threshold amount above a nominal operating voltage of said camera and (ii) a threshold amount below the nominal operating voltage of said camera, said microcontroller adjusts the power supply to said camera; and
    wherein the voltage is measured at both of (i) a node between said power supply and said power filter and (ii) a sense node at said power supply, and wherein said microcontroller, responsive to the measured voltages, determines if said power supply is working normally or is defective.

15. The vision system of claim 14, wherein, (i) responsive to a determination that the measured voltage level is about zero volts, said microcontroller determines that a malfunction has occurred and shuts off the power supply to said camera, (ii) responsive to a determination that the measured voltage level is greater than about zero volts and less than the threshold amount below the nominal operating voltage of said camera, said microcontroller determines that a camera malfunction has occurred and shuts off the power supply to said camera, and (iii) responsive to a determination that the measured voltage level is greater than the threshold amount above the nominal operating voltage of said camera, said microcontroller determines that an overvoltage condition shuts off the power supply to said camera.

16. A vision system for a vehicle, said vision system comprising:
a camera configured to be disposed at a vehicle so as to have a field of view interior or exterior of the vehicle;
a control unit comprising a power supply, a power filter, a receiver and a microcontroller, wherein said camera is connected to said control unit via a low-voltage differential signaling wire;
wherein said control unit comprises an asymmetrical low-voltage differential signaling wire driver;
wherein said power supply operable to supply a voltage for powering said camera;
wherein said power filter is in communication with said power supply and said camera and operable to supply a voltage to said camera; wherein said power filter comprises a low pass filter;
wherein said receiver receives data captured by said camera and provides an output to said microcontroller for processing;
wherein said microcontroller is operable to measure a voltage level supplied to said power filter;
wherein, responsive to the determination that the measured voltage level is one of (i) a threshold amount above a nominal operating voltage of said camera and (ii) a threshold amount below the nominal operating voltage of said camera, said microcontroller adjusts the power supply to said camera; and
wherein the voltage is measured at both of (i) a node between said power supply and said power filter and (ii) a sense node at said power supply, and wherein said microcontroller, responsive to the measured voltages, determines if said power supply is working normally or is defective.

17. The vision system of claim 16, wherein, (i) responsive to a determination that the measured voltage level is about zero volts, said microcontroller determines that a malfunction has occurred and shuts off the power supply to said camera, (ii) responsive to a determination that the measured voltage level is greater than about zero volts and less than the threshold amount below the nominal operating voltage of said camera, said microcontroller determines that a camera malfunction has occurred and shuts off the power supply to said camera, and (iii) responsive to a determination that the measured voltage level is greater than the threshold amount above the nominal operating voltage of said camera, said microcontroller determines that an overvoltage condition shuts off the power supply to said camera.

* * * * *